W. M. GOLDSMITH.
INSERT FOR PLASTIC MATERIALS.
APPLICATION FILED MAY 27, 1920.
1,394,002.
Patented Oct. 18, 1921.
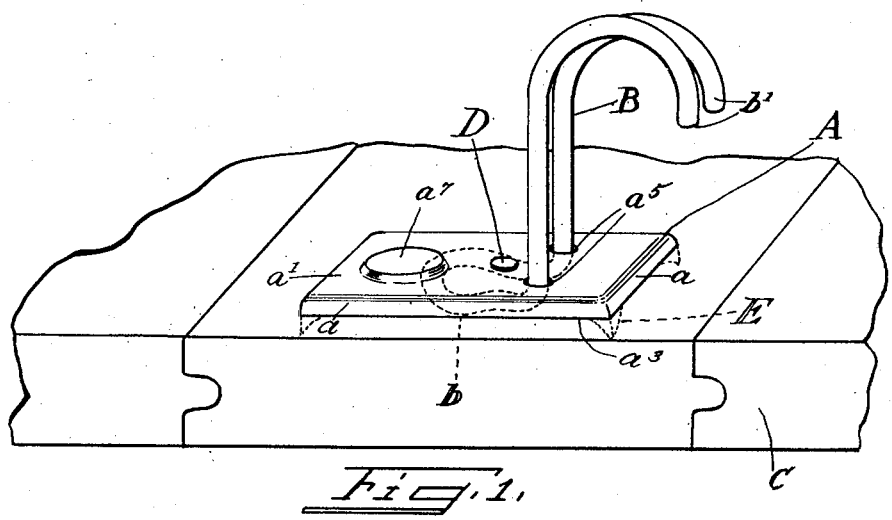
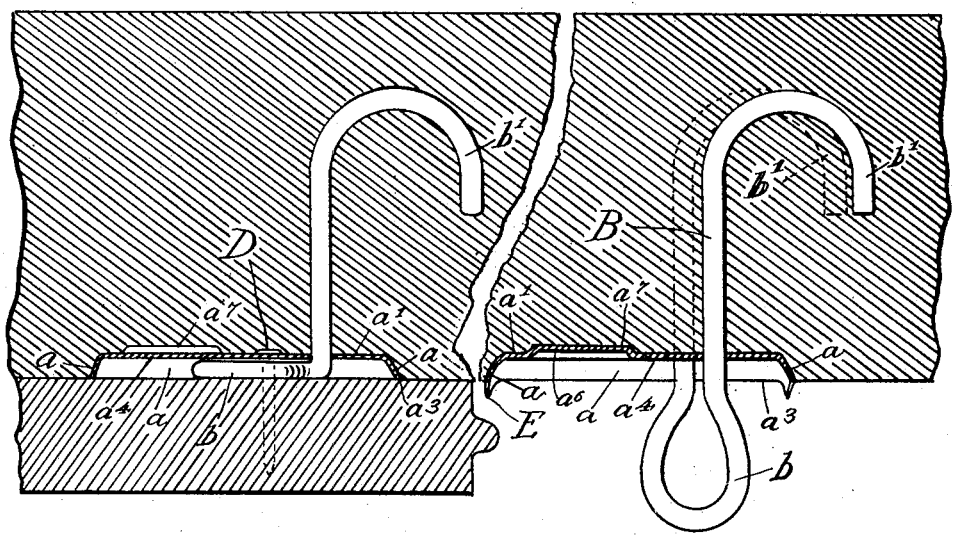
INVENTOR:
William M. Goldsmith
BY Walter F. Murray
ATTORNEY.

UNITED STATES PATENT OFFICE.

WILLIAM M. GOLDSMITH, OF CINCINNATI, OHIO.

INSERT FOR PLASTIC MATERIALS.

1,394,002.   Specification of Letters Patent.   Patented Oct. 18, 1921.

Application filed May 27, 1920. Serial No. 384,692.

*To all whom it may concern:*

Be it known that I, WILLIAM M. GOLDSMITH, a citizen of the United States of America, and resident of Cincinnati, in the county of Hamilton and State of Ohio, have invented a new and useful Improvement in Inserts for Plastic Materials, of which the following is a specification.

An object of my invention is to provide an insert for plastic construction, that is easily applied, cheaply manufactured and that will be highly efficient.

Another object of my invention is to provide a device for the purpose stated, that can be readily assembled.

Another object is to provide a device which after having been partly embedded in the plastic, can have its projecting part readily bent to any desired position.

Another object is to eliminate any unsightly projections from the plastic after the mold has been removed therefrom.

These and other objects are attained by means described herein and disclosed in the accompanying drawing in which:

Figure 1 is a perspective view of a device embodying my invention mounted upon a mold used in plastic construction work.

Fig. 2 is a side elevation of the device shown in Fig. 1, part in section, partly embedded in the plastic.

Fig. 3 is a perspective view of a device embodying my invention partly embedded in the plastic.

My invention comprises a cap A through which extends an insert B. The perforated cap A is pressed into a form similar to an inverted tray and has the sides $a$ extending from its center or raised portions $a'$, the edges of the sides forming a base $a^3$. The insert B has an eye $b$ adapted to be secured between the under side $a^4$ of the cap and the mold C and has fingers $b'$ extending through the perforations $a^5$ in the center portion of the cap. A recess $a^6$ is formed in the under side of the cap by raising the boss $a^7$ upon the cap. The eye $b$ formed on the insert extends partly over this recess. A nail D, a series of sharp projecting points E formed on the base or any other means may be used to secure the cap to the mold. That part of the insert extending into the mold may have any shape or form that will when embedded in the plastic and when the mold has been removed, support the eye $b$ formed on the insert. After the mold C is removed from the plastic the eye $b$ is readily moved away from the cap A by inserting a chisel into the recess $a^6$ of the cap, since the recess $a^6$ affords room for the insertion of the tool between the eye and the cap. The insert may be of any shape or form.

The cap may be made in any shape but is preferably made so as to have a shallow tray-like form, the depth thereof being substantially equal to the thickness of the material of which the insert B is made.

The application and operation of my device is as follows:

The fingers $b'$ of the insert are passed through the perforations in the cap and extend beyond the upper surface of the cap, thereby seating the eye upon the under side of the cap as shown in Fig. 2. The cap is then secured to the mold or temporary flooring C by means of the nail D. The plastic is then placed on the mold and surrounds the fingers of the insert. The cap prevents the plastic engaging the eye $d$. When the mold or temporary flooring is removed the fingers will be securely embedded in the plastic the cap will be on the surface of the plastic, and the eye can then be readily bent away from the cap by inserting a chisel or similar tool between the eye and the cap. Lath or anything that is to be supported by the plastic or suspended therefrom can be readily attached to the eyes.

What I claim is:

1. As a new article of manufacture for use with plastic construction, a cap comprising a flat metallic plate having substantially the shape of a shallow inverted tray and having spaced perforations in its top, fastening means adapted to be driven into the mold and to thereby secure the cap in position, and an insert comprising a single metallic rod having an eye formed intermediate its ends and having its ends turned upon themselves to form hooks, and each end extending through one of the perforations in the plate, the eye assuming a position within the depressed portion of the cap and being capable of being moved to an extended position after the hooked ends are embedded in a plastic material.

2. As a new article of manufacture for use with plastic construction, a cap comprising a flat metallic plate having substantially the shape of a shallow inverted tray and having a recess and spaced perforations in its top, and an insert comprising a metallic rod having an eye formed intermediate its ends and having its ends turned upon themselves and each end extending through one of the perforations in the plate, the eye assuming a position within the depressed portion of the cap and extending over the recess and being capable of being moved to an extended position after the ends of the rod are embedded in a plastic material.

3. As a new article of manufacture for use with plastic construction, a perforated cap, a recess formed on the cap, an insert, an eye formed on the insert, the eye being adapted to assume a position between the cap and a mold in which the plastic is to be placed and to have such eye extending partly over the recess formed in the cap, and fingers on the insert extending through the perforations in the cap, the eye being capable of being moved to an extended position after the fingers are embedded in a plastic material.

In witness whereof, I have hereunto subscribed my name this 22nd day of May, 1920.

WILLIAM M. GOLDSMITH.